(12) United States Patent
Stuler (10) Patent No.: US 8,064,229 B2
(45) Date of Patent: Nov. 22, 2011

(54) METHOD OF FORMING A SERIES RESONANT SWITCHING POWER SUPPLY CONTROL CIRCUIT AND STRUCTURE THEREFOR

(75) Inventor: Roman Stuler, Karolinka (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 643 days.

(21) Appl. No.: 12/268,816

(22) Filed: Nov. 11, 2008

(65) Prior Publication Data
US 2010/0118565 A1 May 13, 2010

(51) Int. Cl.
*H02M 3/335* (2006.01)

(52) U.S. Cl. ............... 363/21.06; 363/21.14; 363/21.02

(58) Field of Classification Search .............. 363/20, 363/21.02, 21.04, 21.06, 21.08, 21.09, 21.12, 363/21.14, 21.16, 21.17, 21.03, 78, 95, 97
See application file for complete search history.

(56) References Cited

U.S. PATENT DOCUMENTS

| | | | |
|---|---|---|---|
| 5,248,866 A * | 9/1993 | Tanaka et al. ............... | 219/624 |
| 5,303,138 A | 4/1994 | Rozman | |
| 5,920,475 A | 7/1999 | Boylan et al. | |
| 5,956,245 A | 9/1999 | Rozman | |
| 5,991,171 A | 11/1999 | Cheng | |
| 5,999,420 A | 12/1999 | Aonuma et al. | |
| 6,198,638 B1 | 3/2001 | Lee | |
| 6,373,727 B1 | 4/2002 | Hedenskog et al. | |
| 6,400,583 B1 | 6/2002 | Lau | |
| 6,418,039 B2 | 7/2002 | Lentini et al. | |
| 6,473,317 B1 | 10/2002 | Simopoulos | |
| 6,477,065 B2 * | 11/2002 | Parks ........................ | 363/21.06 |
| 6,535,400 B2 | 3/2003 | Bridge | |
| 6,597,221 B2 | 7/2003 | Hall et al. | |
| 6,812,682 B2 | 11/2004 | Hachiya | |
| 6,813,166 B1 | 11/2004 | Chang et al. | |
| 7,136,294 B2 | 11/2006 | Phadke et al. | |
| 7,285,875 B2 | 10/2007 | Yasumura | |
| 7,315,460 B2 | 1/2008 | Kyono | |
| 7,339,801 B2 | 3/2008 | Yasumura | |
| 7,821,239 B2 * | 10/2010 | Hosotani et al. ............. | 323/267 |
| 7,843,708 B2 * | 11/2010 | Seong ....................... | 363/21.02 |
| 2005/0248964 A1 | 11/2005 | Dalal | |
| 2008/0002441 A1 | 1/2008 | Allinder | |
| 2008/0048575 A1 * | 2/2008 | Muramatsu et al. ..... | 315/209 M |

OTHER PUBLICATIONS

Guan-Chyun Hsieh, Cheng-Yuan Tsai and Wei-Li Hsu, "Synchronous Rectification LLC Series-Resonant Converter", Applied Power Electronics Conference, APEC 2007—Twenty Second Annual IEEE Feb. 25, 2007-Mar. 1, 2007 pp. 1003-1009 Digital Object Identifier 10.1109/APEX.2007.357637.

Roman Stuler, "Implementing an LCD TV Power Supply with the NCP1396A, NCP1605, and NCP1027", Application Note Jun. 2007—Rev. 1, Copyright Semiconductor Components Industries, LLC, 2007, Publication Order No. AND8293/D, 18 pages.

Roman Stuler, "Implementing a Medium Power AC-DC Converter with the NCP1395", Application Note Sep. 2006—Rev. 2, Copyright Semiconductor Components Industries, LLC, 2006, Publication Order No. AND8257/D, 19 pages.

* cited by examiner

*Primary Examiner* — Adolf Berhane
*Assistant Examiner* — Jeffrey Gblende
(74) *Attorney, Agent, or Firm* — Robert F. Hightower (57) ABSTRACT

In one embodiment, a control circuit for a series resonant switching power supply control system is configured to disable a power switch of secondary side of the system in response to a polarity reversal of the voltage across a primary side winding of the system.

18 Claims, 8 Drawing Sheets

METHOD OF FORMING A SERIES RESONANT SWITCHING POWER SUPPLY CONTROL CIRCUIT AND STRUCTURE THEREFOR

BACKGROUND OF THE INVENTION

The present invention relates, in general, to electronics, and more particularly, to methods of forming semiconductor devices and structure.

In the past, various methods and structures were utilized to produce resonant switching power supply converter systems. The resonant switching power supply converter system generally used an isolation transformer that included primary and secondary windings. A capacitor was connected in series with the primary winding so that the capacitance and the inductance of the inductor formed a resonant circuit having a resonant frequency. The isolation transformer was formed so that there was a loose inductive coupling between the primary and secondary windings which resulted in a low coupling coefficient between the primary and secondary windings. This loose inductive coupling formed a parasitic inductor in series with the primary winding inductance which was often referred to as a leakage inductance that represented the coupling between the secondary and primary windings. A rectifier diode, such as a Schottky diode, usually was coupled in series with the secondary winding in order to form an output voltage from the currents induced into the secondary winding.

In some embodiments, a synchronous rectifier transistor was coupled in parallel with the rectifier diode in order to increase the efficiency of the power supply system. The synchronous rectifier transistor usually was controlled responsively to the current through the rectifier diode that was in the secondary. A secondary side control circuit usually was configured to control the synchronous rectifier. These secondary side control circuit usually were designed to turn the synchronous rectifier on when the secondary current increased to a value that was just above zero and was designed to turn the synchronous rectifier off when the current through the rectifier diode decreased to a value that was zero. One problem with such configurations was that the efficiency of the series resonant switching power supply system decreased as the switching frequency of the transistors on the primary side increased to a value that was equal to or greater than the resonant frequency formed by the capacitor and the leakage inductance of the transformer. This type of operation also increased electromagnetic interference.

Accordingly, it is desirable to have a series resonant switching power supply system that can operate near above the Series resonant frequency with a high efficiency and with a low electromagnetic inference.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, or certain N-type or P-type doped regions, a person of ordinary skill in the art will appreciate that complementary devices are also possible in accordance with the present invention. It will be appreciated by those skilled in the art that the words during, while, and when as used herein relating to circuit operation are not exact terms that mean an action takes place instantly upon an initiating action but that there may be some small but reasonable delay, such as a propagation delay, between the reaction that is initiated by the initial action. The use of the word approximately or substantially means that a value of an element has a parameter that is expected to be very close to a stated value or position. However, as is well known in the art there are always minor variances that prevent the values or positions from being exactly as stated. It is well established in the art that variances of up to at least ten per cent (10%) (and up to twenty per cent (20%) for semiconductor doping concentrations) are reasonable variances from the ideal goal of exactly as described.

DETAILED DESCRIPTION OF THE DRAWINGS

Figure 1:
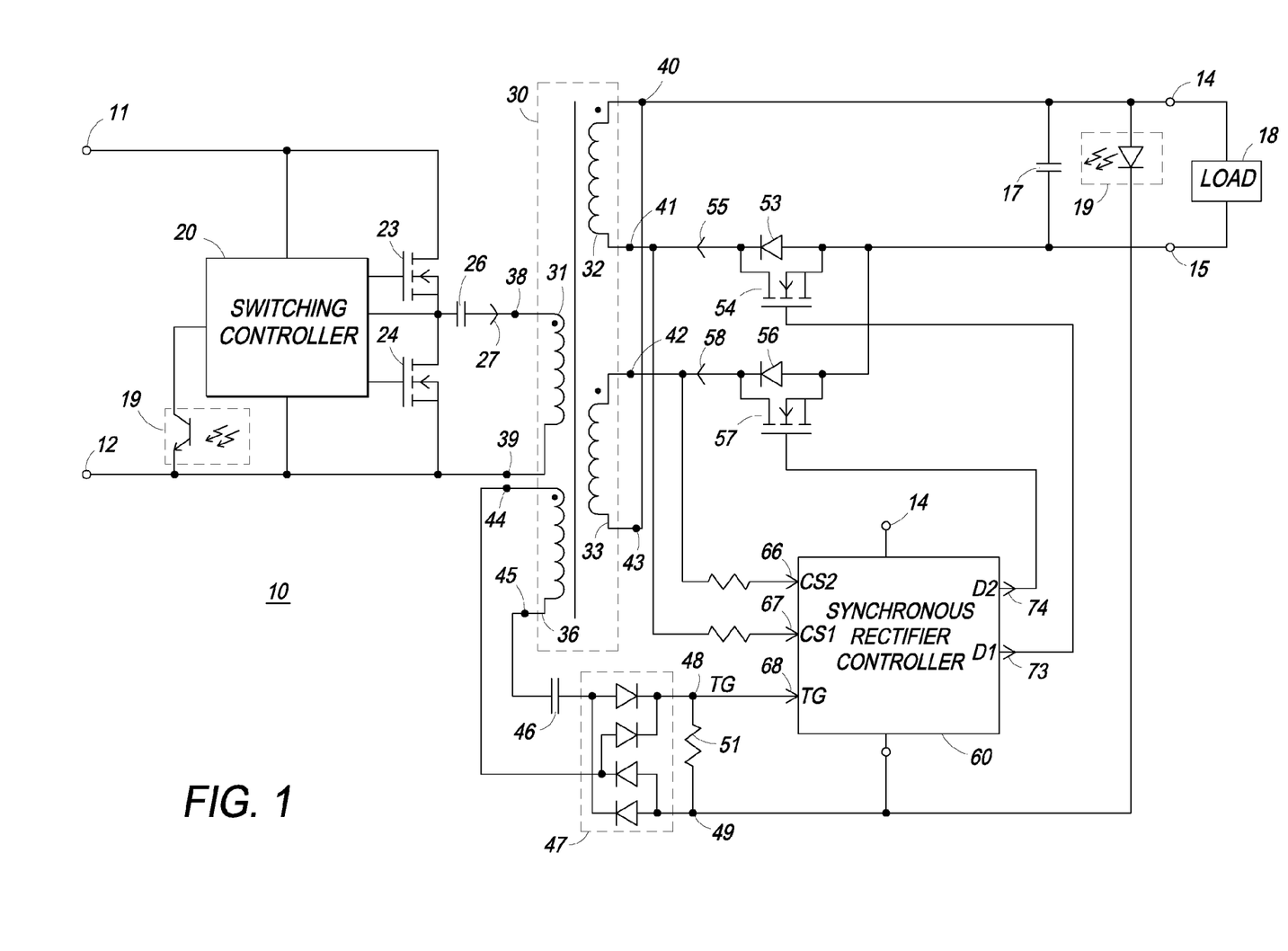
FIG. 1 schematically illustrates an embodiment of a portion of a series resonant switching power supply system in accordance with the present invention.

FIG. 1 schematically illustrates an embodiment of a portion of a series resonant switching power supply system 10. System 10 is portioned into a primary side and a secondary side by an isolation transformer 30. Transformer 30 includes a primary winding 31, an auxiliary winding 36, a first secondary winging 32, and a second secondary winding 33. The primary side of system 10 receives input power and an input voltage, such as a rectified DC voltage, between an input terminal 11 and a power return terminal 12. The primary side includes a primary side switching power supply controller 20, power transistors 23 and 24, and a resonant capacitor 26. Primary side switching power supply controller 20 is connected to operate transistors 23 and 24 to control a primary current 27 through winding 31 in order to regulate the value of an output voltage formed between a voltage output 14 and a voltage return 15 on a secondary side of system 10. Controller 20 receives a feedback voltage, from a feedback network 19, that is representative of the value of the output voltage and responsively operates switching transistors 23 and 24 in order to regulate the output voltage to a target value that is within a range of values. Capacitor 26 is coupled in series between transistors 23 and 24 and the inductance of primary winding 31 so that capacitor 26 may form a series resonant circuit with the leakage inductance of transformer 30.

A secondary side of system 10 includes first secondary winding 32 and second secondary winding 33 that are coupled through transformer 30 to primary winding 31. A rectifier diode 53, such as a Schottky diode or other type of fast recovery diode, is coupled in series between winding 32 and voltage return 15. A synchronous rectifier transistor 54 is connected in parallel with diode 53. During the operation of system 10, a secondary voltage (VS) is formed across winding 32. Another rectifier diode 56, that is similar to diode 53, is connected in series between secondary winding 33 and return 15. Another synchronous rectifier transistor 57 is connected in parallel with diode 56. A synchronous rectifier controller 60 is connected in the secondary side of system 10 in order to control the operation transistors 54 and 57. Controller 60 includes a first current sense input 67 that is configured to receive a first current sense (CS1) signal that is representative of a secondary current 55 that flows through winding 32 and transistor 54. A second current sense input 66 of controller 60 is configured to receive a second current sense (CS2) signal that is representative of a secondary current 58 that flows through winding 33 and transistor 57.

System 10 also is configured to form a trigger (TG) signal that is representative of a change in a primary voltage (VP) that is formed across primary winding 31. Auxiliary winding 36 assists in forming the trigger (TG) signal. An input side of a bridge rectifier 47 is connected to auxiliary winding 36 through a capacitor 46 in order to rectify the voltage formed by winding 36. Capacitor 46 forms changes in the current produced by winding 36 into a voltage pulse as will be seen further hereinafter. Resistor 51 is connected across the output side of rectifier 47 in order to translate the current through rectifier 47 into a voltage between output terminals 48 and 49 of rectifier 47. The voltage formed across resistor 51 forms the trigger (TG) signal. Controller 60 receives the TG signal on a TG input 68. Controller 60 also includes a first drive output 73 that is connected to provide a first drive (D1) signal to operate transistor 54. A second drive output 74 of controller 60 is connected to provide a second drive (D2) signal to operate transistor 57.

Figure 2:
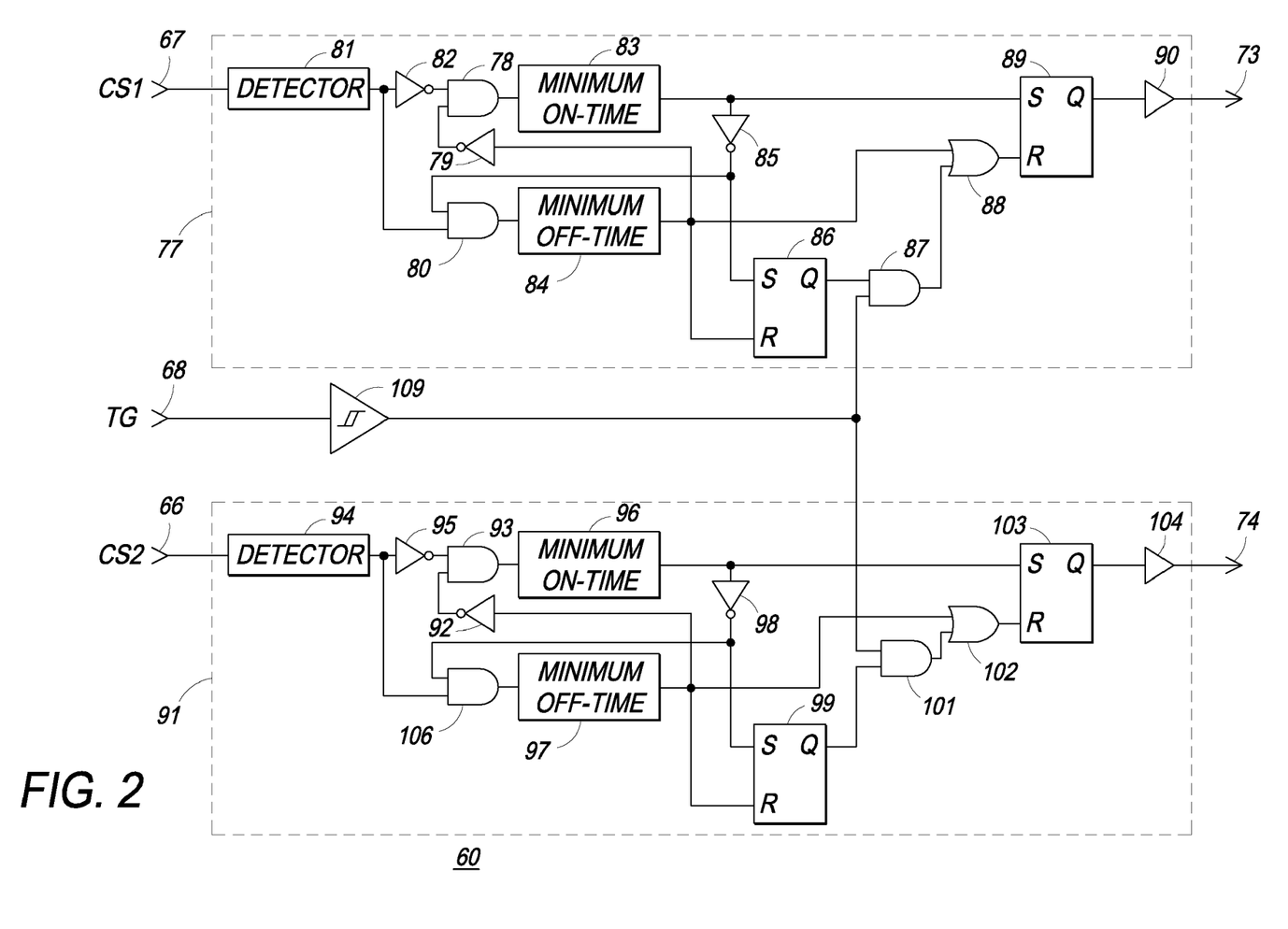
FIG. 2 schematically illustrates a portion of an exemplary embodiment of a controller of the series resonant switching power supply system of FIG. 1 in accordance with the present invention.

FIG. 2 schematically illustrates a portion of an exemplary embodiment of controller 60. This exemplary embodiment of controller 60 includes a first synchronous rectifier control channel 77 and second synchronous rectifier control channel 91 that are configured to operate respective transistors 54 and 57. A trigger processing circuit of controller 60 is configured to receive the trigger (TG) signal on input 68 and includes a trigger (TG) receiver 109. Channel 77 includes a first current sense (CS1) detector 81 that receives the first current sense (CS1) signal on input 67. Channel 77 also includes a logic circuit that processes the signals that result from receiving the CS1 signal and the TG signal. The logic circuit includes a minimum on-time circuit 83, a minimum off-time circuit 84, inverters 79, 82, and 85, latches 89 and 86, AND gates 78, 80, and 87, OR gate 88, and a driver circuit 90. Similarly, channel 91 includes a second current sense (CS2) detector 94 that receives the second current sense (CS2) signal on input 66. Channel 91 also includes a logic circuit that processes the signals that result from receiving the CS2 signal and the TG signal. The logic circuit includes a minimum on-time circuit 96, a minimum off-time circuit 97, inverters 92, 95 and 98, latches 99 and 103, AND gates 93, 101, and 106, OR gate 102, and a driver circuit 104.

Channel 77 receives the CS1 signal and forms a minimum on-time for transistor 54 responsively to the CS1 signal going low and forms a minimum off-time for transistor 54 responsively to CS1 going high. Channel 91 similarly forms a minimum on-time and minimum off-time for transistor 57 responsively to respective low and high transitions of CS2.

Figure 3:
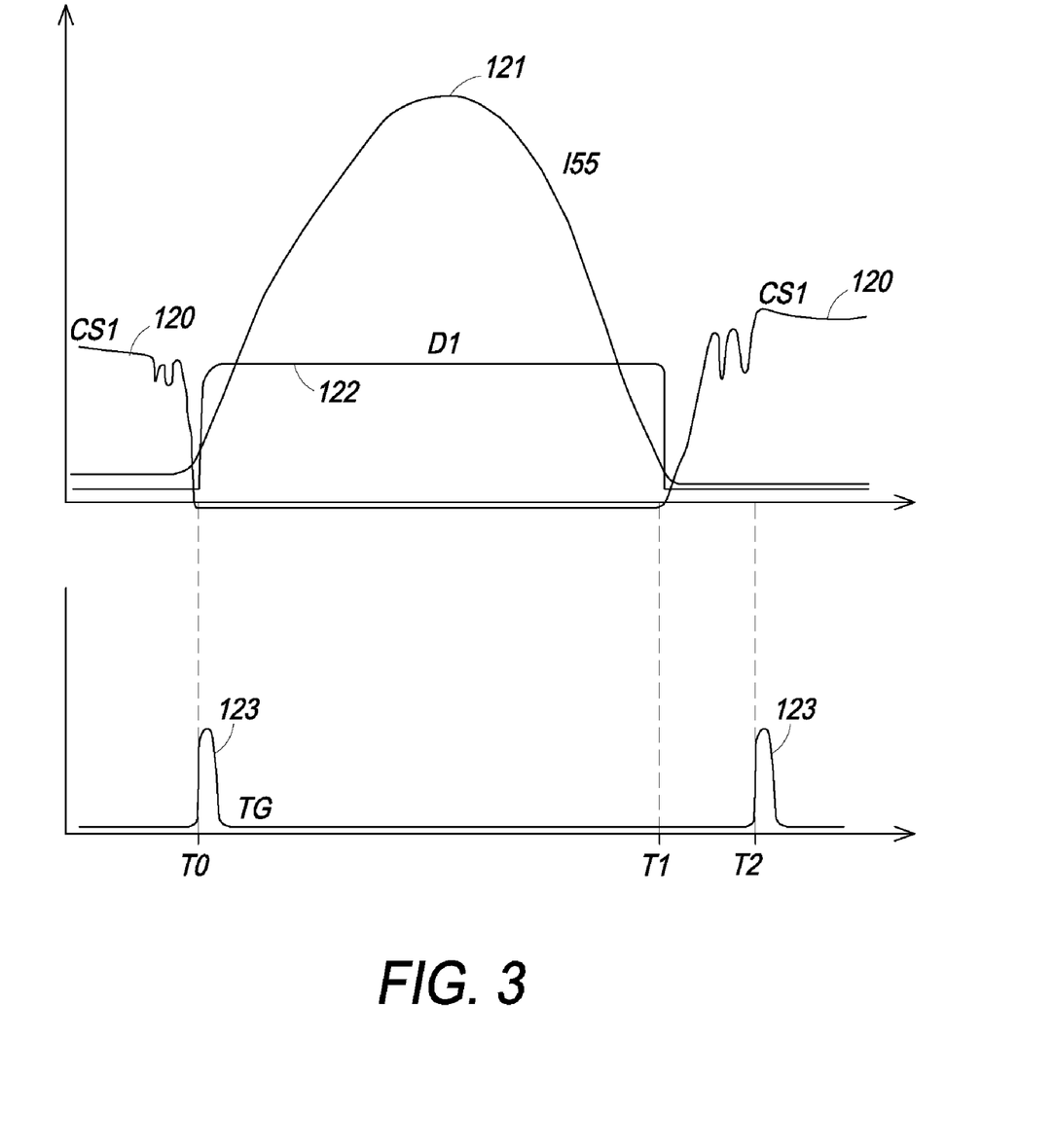
FIGS. 3-5 are graphs having plot of some of the signals formed during the operation of the series resonant switching power supply system in accordance with the present invention.

FIG. 3 is a graph having plots that illustrate some of the signals formed by system 10 during operation at a frequency that is less than the resonant frequency of system 10. The abscissa indicates time and the ordinate indicates increasing value of the illustrated signal. A plot 120 illustrates the secondary CS1 signal, thus the drain voltage of transistor 54 (Vd), relative to return 15. A plot 121 illustrates secondary current 55 (I55), a plot 123 illustrates the trigger (TG) signal at the input of controller 60 relative to the value of return 15, and a plot 122 illustrates the D1 drive signal. This description has references to FIGS. 1-3. Referring to FIG. 3, assume that prior to a time T0, controller 20 in the primary side of system 10 has transistor 23 disabled and transistor 24 enabled. At time T0, controller 20 disables transistor 24 and keeps transistor 23 disabled. Because of the magnetization energy stored in the magnetization inductance of transformer 30, disabling transistor 24 causes the primary voltage VP to reverse and then increase. The increase in the primary voltage causes the secondary voltage VS to decrease. Because auxiliary winding 36 has a high coupling coefficient to winding 31, the increased value of VP resulting from disabling transistor 24 also induces an auxiliary voltage (VA) across winding 36. Typically, the coupling coefficient between windings 31 and 36 is at least about 0.95. The auxiliary voltage VA causes a current to flow from terminal 44 through rectifier 47 and resistor 51 thereby causing the TG signal to increase as illustrated at time T0 by plot 123. Because of capacitor 46 and resistor 51, the current forms the TG signal as a pulse at time T0. Transistor 23 is enabled after some dead time that is inserted between transistors 23 and 24 to prevent shoot through currents. Transistor 23 is enabled substantially a brief time after T0.

The energy coupled to secondary winding 32 decreases VS and induces current 55 to begin to flow through winding 32. Once the magnetizing inductance of transformer 30 is fully discharged by current 55, any energy required by the secondary is taken from terminal 11 through transistor 23. The decrease in VS causes the CS1 signal to begin decreasing and preferably to drop below the value of return 15. Detector 81 of channel 77 receives the CS1 signal. At time T0, the CS1 signal decreases to a first value relative to return 15, preferably less than the value of return 15, that is representative of a first value of current 55 beginning to flow. This first value of current 55 is as near to zero as can be formed by the offset voltage within the circuits used to detect the CS1 signal. Detector 81 detects the low going edge CS1 signal which forces the output of detector 81 low. The low from detector 81 forces the output of inverter 82 high. Since the output of circuit 84 is low, the signal from inverter 82 triggers circuit 83 through gate 78. This arrangement assures that transistor 54 will not be turned on until the minimum off-time period elapses. Triggering circuit 83 forces the output of circuit 83 high for a time interval that is determined by a timer within circuit 83. The time interval is generally set to a desired minimum on-time for transistor 54. The high from circuit 83 sets latch 89 and holds latch 89 set for the time interval. Holding the set input high for the time interval ensures that noise on the CS1 input can not reset latch 89 until the time interval of the minimum on-time expires. Setting latch 89 forces the D1 drive signal high thereby enabling transistor 54 as illustrated at time T0. Enabling transistor 54 forms a low resistance path for current 55. When the time interval of the minimum on-time expires, the output of circuit 83 goes low which forces the output of inverter 85 high to set latch 86. When latch 86 is set, gate 87 becomes transparent for the TG signal from receiver 109. Latch 89 can thus be reset by the TG signal on input 68 in the time interval that lasts from the minimum on-time period end to the minimum off-time period starts. The high from latch 86 enables gate 87 to respond to the TG signal. Since this occurs sometime after T0, the TG signal has already gone low when latch 86 is set.

Subsequently at a time T2, controller 20 disables transistor 23 to terminate primary current 27. However, because system 10 is operating below the resonant frequency, the resonant half cycle of current 55 ends before the switching half period ends as illustrated by current 55 decreasing before time T2. Thus, current 55 is not flowing through secondary winding 32 for the entire time that transistor 23 is enabled. At a time T1, the value of current 55 decreases to a second value which forces the CS1 signal to increase from the first value to a second value that is greater than the value of return 15 Preferably, this second value of current 55 is also as near to zero as can be formed by the offset voltage within the circuits used to detect the CS1 signal. The increase of the CS1 signal causes the output of detector 81 to go high. The high from detector 81 triggers circuit 84 to force the output of circuit 84 high for a time interval that is determined by a timer within circuit 84. The time interval is generally set to a desired minimum off-time for transistor 54. The high from circuit 84 resets latch 89 and holds latch 89 reset for the time interval of the minimum off-time. The CS1 signal can oscillate when current 55 is terminated or subsequently at time T2 when transistor 23 is disabled. Holding the reset input of latch 89 high for the time interval ensures that noise on the CS1 input can not set latch 89 until the time interval of the minimum off-time has expired. The high from circuit 84 also resets latch 86 which prevents the TG signal from affecting latch 89 or transistor 54. After the time interval of circuit 84 is complete, the output of circuit 84 goes low and allows subsequent transitions of detector 81 to set latch 89. However, latch 86 remains reset thereby blocking the TG signal Subsequently at time T2, controller 20 disables transistor 23 to terminate primary current 27 which causes the primary voltage VP across primary winding 31 to decrease. Current 55 has already decreased to zero by the time that transistor 23 is disabled. The increased primary voltage causes the CS1 signal to also increase. Because auxiliary winding 36 has a high coupling coefficient to winding 31, the increased value of VP resulting from disabling transistor 23 also induces the auxiliary voltage VA across winding 36. The auxiliary voltage VA causes a current to flow from terminal 44 through rectifier 47 and resistor 51 thereby causing the TG signal to increase as illustrated at time T2 by plot 123. The increase in the TG signal forces the output of receiver 109 high. Since latch 86 is reset, the TG signal does not affect the output of gate 87. Thus, the TG signal does not affect latch 89 under these conditions. As mentioned previously, latch 89 can be reset by the TG signal on input 68 during the time interval that lasts from the end of the minimum on-time period to the beginning of the min off-time period.

Figure 4:
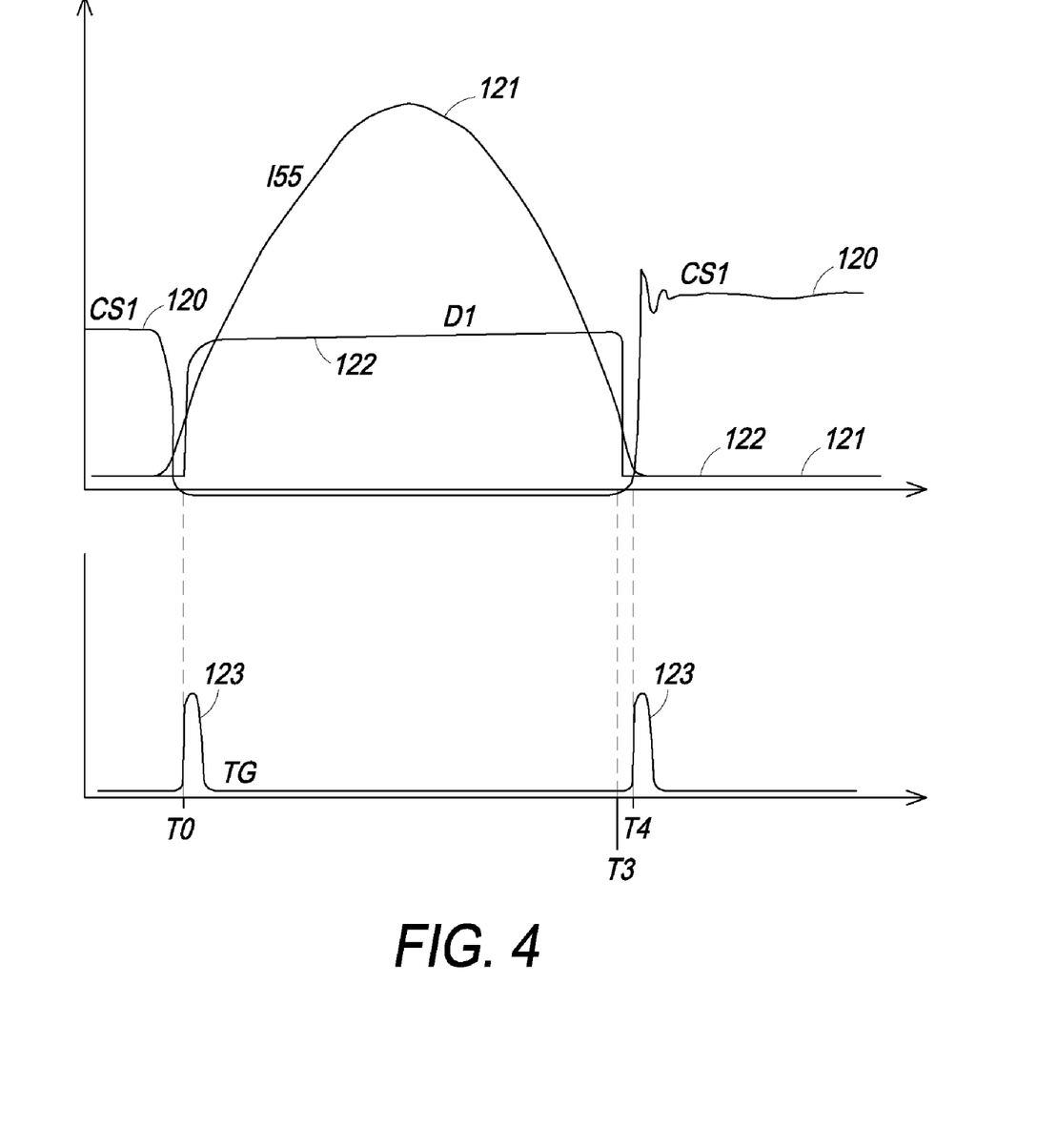

FIG. 4 is a graph that illustrates some of the signals formed by system 10 during operation at a frequency that is substantially the resonant frequency of system 10. The abscissa indicates time and the ordinate indicates increasing value of the illustrated signal. This description has references to FIGS. 1-4. Assume that prior to time T0, controller 20 again has transistor 23 disabled and transistor 24 enabled. At time T0, controller 20 disables transistor 24. Energy stored in the magnetizing inductance of transformer 30 causes the CS1 signal to decrease to a value that is less than the value of return 15 and also induces current 55 to begin to flow through winding 32. The increased value of VP also induces an auxiliary voltage VA across winding 36. The auxiliary voltage VA causes the TG signal to increase as illustrated at time T0 by plot 123 as explained previously in the description of FIG. 3. Transistor 23 is enabled again after just after time T0 as explained previously in the description of FIG. 3.

The energy coupled to winding 32 induces current 55 to flow and causes the CS1 signal at terminal 41 to decrease, preferably to a value that is less than the value of return 15. As described previously for the conditions explained in the description of FIG. 3, detector 81 of channel 77 receives the CS1 signal. When the CS1 signal decrease past the first value that is representative of the first value of current 55, the low value of the CS1 signal forces the output of detector 81 low thereby enabling transistor 54 as explained previously in the description of FIG. 3. As described previously, latch 86 remains reset as a result from the previous cycle, thus the TG signal has no effect on latch 89 or transistor 54.

Subsequently at a time T4, controller 20 disables transistor 23 to terminate primary current 27. Because the frequency at which controller 20 is operating is the same frequency as the resonant frequency formed by the resonant circuit of capacitor 26 and the leakage inductance of transformer 30, current 55 flows for substantially the entire time that transistor 23 is enabled. Consequently, current 55 begins to decrease and becomes approximately zero at approximately the time that transistor 23 is disabled as illustrated at time T4. At a time T3 the value of current 55 decreases to the second threshold value that forces the CS1 signal to increase from the first value to the second value that causes the output of detector 81 to go high responsive to the second value of the CS1 signal. As explained previously in the description of FIG. 3, the high from detector 81 triggers circuit 84 to force the output of circuit 84 high for the time interval of the minimum off-time. The high from circuit 84 resets latch 89 and holds latch 89 reset for the time interval. The high from circuit 84 also resets latch 86 which prevents the TG signal from affecting latch 89 or transistor 54. After the time interval of circuit 84 is complete, the output of circuit 84 goes low and allows subsequent transitions of detector 81 to set latch 89. However, latch 86 remains reset to prevent the TG signal from having an effect thereon.

At time T4, controller 20 disables transistor 23 to terminate primary current 27 which causes the primary voltage VP across primary winding 31 to increase. Because system 10 is operating at the resonant frequency, current 55 decreases to zero approximately at the same time that transistor 23 is disabled minus some turn-off delay for transistor 23, thus, times T3 and T4 are shown to be separated by this turn-off delay. The distance shown between T3 and T4 is exaggerated for clarity of the description. Disabling transistor 23 induces the auxiliary voltage VA across auxiliary winding 36 thereby causing the TG signal to increase as illustrated at time T4. Since latch 86 is reset, the TG signal does not affect the output of gate 87. Thus, the TG signal does not affect latch 89 under these conditions.

Figure 5:
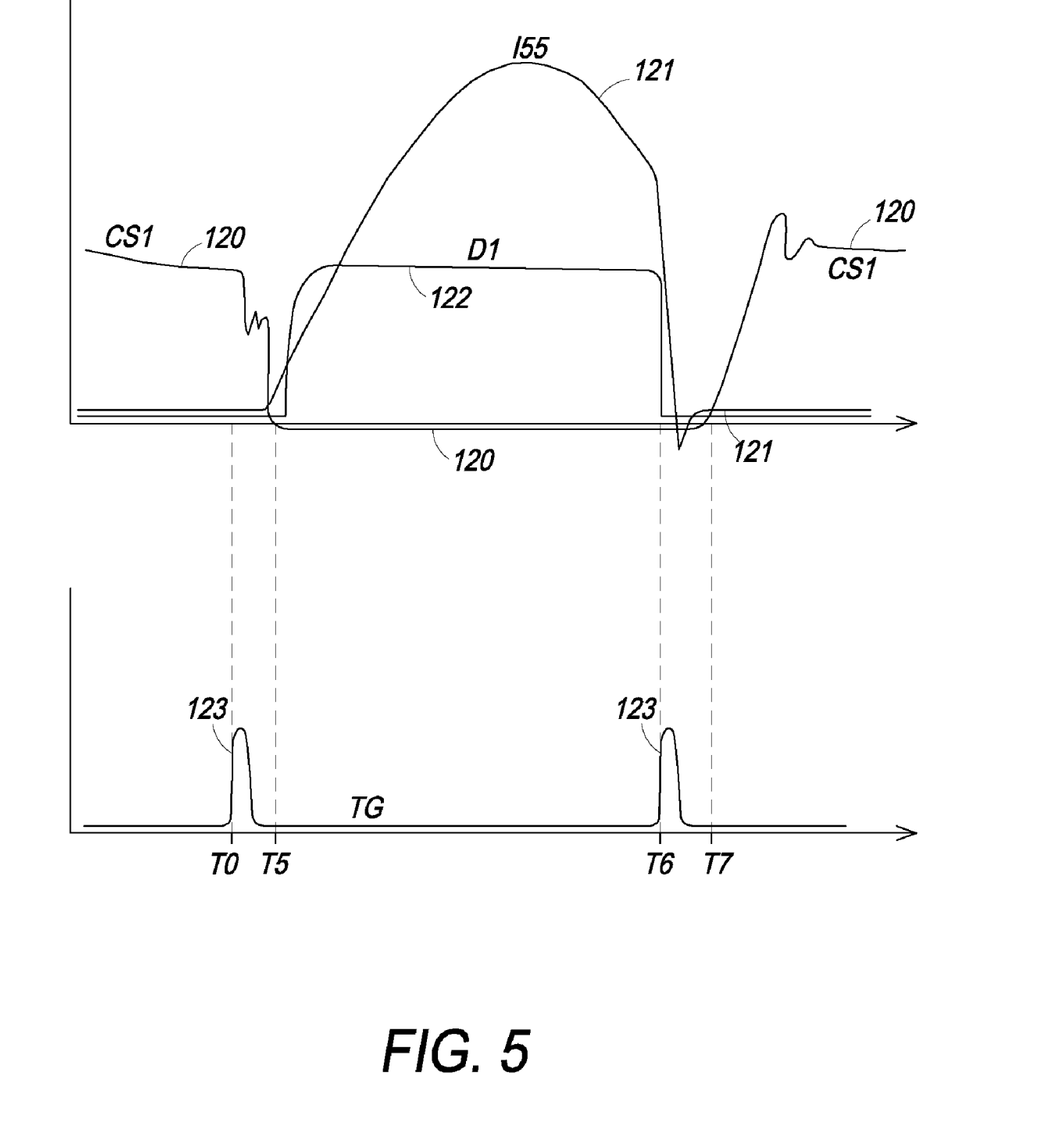

FIG. 5 is a graph that illustrates some of the signals formed by system 10 during operation at a frequency that is greater than the resonant frequency of system 10. The abscissa indicates time and the ordinate indicates increasing value of the illustrated signal. This description has references to FIGS. 1-5. Referring to FIG. 5, assume that prior to time T0, controller 20 in the primary side of system 10 has transistor 23 disabled and transistor 24 enabled. At time T0, controller 20 disables transistor 24 and keeps transistor 23 disabled. Disabling transistor 24 causes the primary voltage VP to reverse and increase. As described previously, the increase VP signal causes the TG signal to go high. Transistor 23 is enabled after some dead time that is inserted between transistors 23 and 24 to prevent shoot through currents. Since system 10 is operating at a frequency that is greater than the resonant frequency, the leakage inductance of transformer 30 and winding 32 causes a delay between the primary and secondary windings. Therefore, the secondary voltage VS does not decrease until the leakage inductance of transformer 30 is fully discharged as illustrated at a time T5. Thus, the CS1 signal does not decrease to the first value until time T5 after the TG signal is formed as illustrated in FIG. 5. At time T5, the CS1 signal has reached the first value relative to return 15 as described previously. Detector 81 senses the low voltage of CS1 and channel 77 enables transistor 54 as described previously in the description of FIGS. 3 and 4. When the output of circuit 83 goes high to set latch 89 and enable transistor 54, the high forces the output of inverter 85 low.

Subsequently at a time T6, controller 20 disables transistor 23. Because system 10 is operating above the resonant frequency, the energy stored in the magnetizing inductance and in the leakage inductance that is related to windings 31 and 32 is sufficient to keep current 55 flowing even after transistor 23 is disabled. Consequently, the half cycle of current 55 is still active when transistor 23 is disabled at time T6, and the CS1 signal is still low. Disabling transistor 23 at time T6 forms the TG signal as explained hereinbefore. Since latch 86 is now set, the increase in the TG signal forces the output of receiver 109 high thereby forcing the output of gate 87 high. The high from gate 87 resets latch 89 through gate 88 thereby disabling transistor 54 approximately at time T6. When the leakage inductance of winding 32 has fully discharged, the CS1 signal begins to go high to the second value as illustrated at time T7. Since latch 89 is already reset, the CS1 signal has no effect on latch 89 or transistor 54. However, when the CS1 signal goes low and the output of circuit 84 responsively goes high, the high resets latch 86 to prepare channel 77 for the next cycle. Thus, it can be seen that even when system 10 is operating above the resonant frequency, controller 60 turns off transistor 54 before the secondary voltage across winding 32 can reverse. This improves the efficiency of system 10.

Because system 10 is operating above the resonant frequency, without channel 77 current 55 would continue to flow after transistor 23 was disabled. Current 55 would flow until the leakage inductance between windings 31 and 32 was discharged by current 55. When current 55 had discharged the leakage inductance, the value of the secondary voltage VS would reverse, however, this would be at such a late time that system 10 would not operate efficiently. Because channel 77 utilizes the trigger (TG) signal to disable transistor 54 when operating above the resonant frequency, transistor 54 is disabled prior to the time that it could be disabled by a reduction in current 55.

Those skilled in the art will appreciate that channel 91 and transistor 57 are configured to operate similarly to channel 77 and transistor 54.

Figure 6:
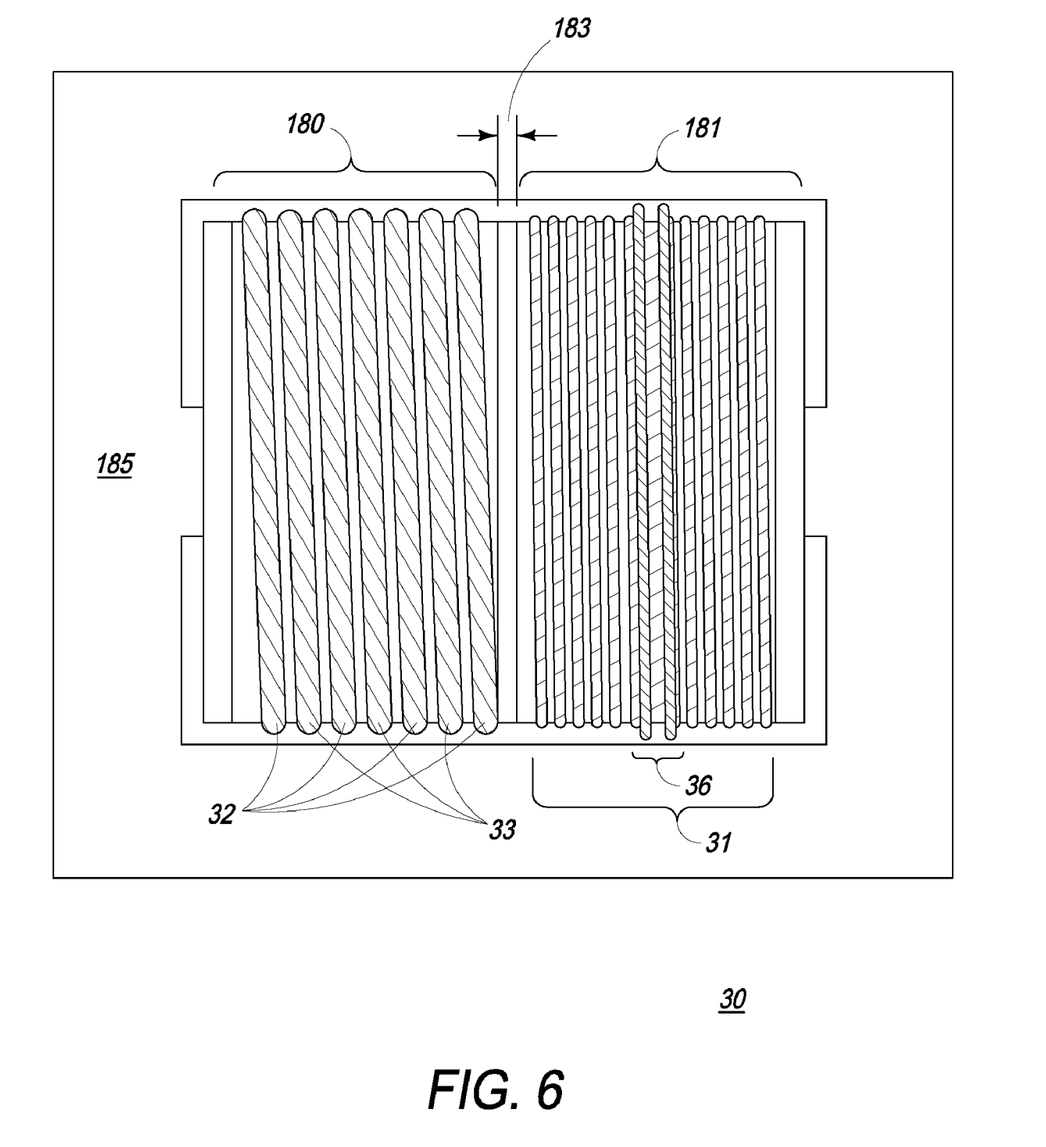
FIG. 6 illustrates an embodiment of a portion of a transformer of the series resonant switching power supply system of FIG. 1 in accordance with the present invention.

FIG. 6 illustrates an embodiment of a portion of a transformer 30. Transformer 30 includes a ferrite core that has a plurality of bobbins. Primary winding 31 is formed as a wire wrapped around a primary bobbin 181. Secondary winding 32 is formed as another wire wrapped around a secondary bobbin 180. Secondary winding 33 is also formed as another wire wrapped around bobbin 180. The turns of the wire for winding 32 are spaced apart so that the turns of winding 33 are positioned between each turn of winding 32 so that the windings alternate as 32, 33, 32, 33, etc. This arrangement provides the desired leakage inductance for winding 31 to winding 32 and for winding 31 to winding 33. The coupling efficiency of winding 31 to winding 32 and of winding 31 to winding 33 generally is less than about 0.92. Auxiliary winding 36 is formed as a wire that is wrapped on top of the wire that is used to form primary winding 31. This provides the desired tight coupling between windings 31 and 36, since windings 31 and 36 are very near together.

Figure 7:
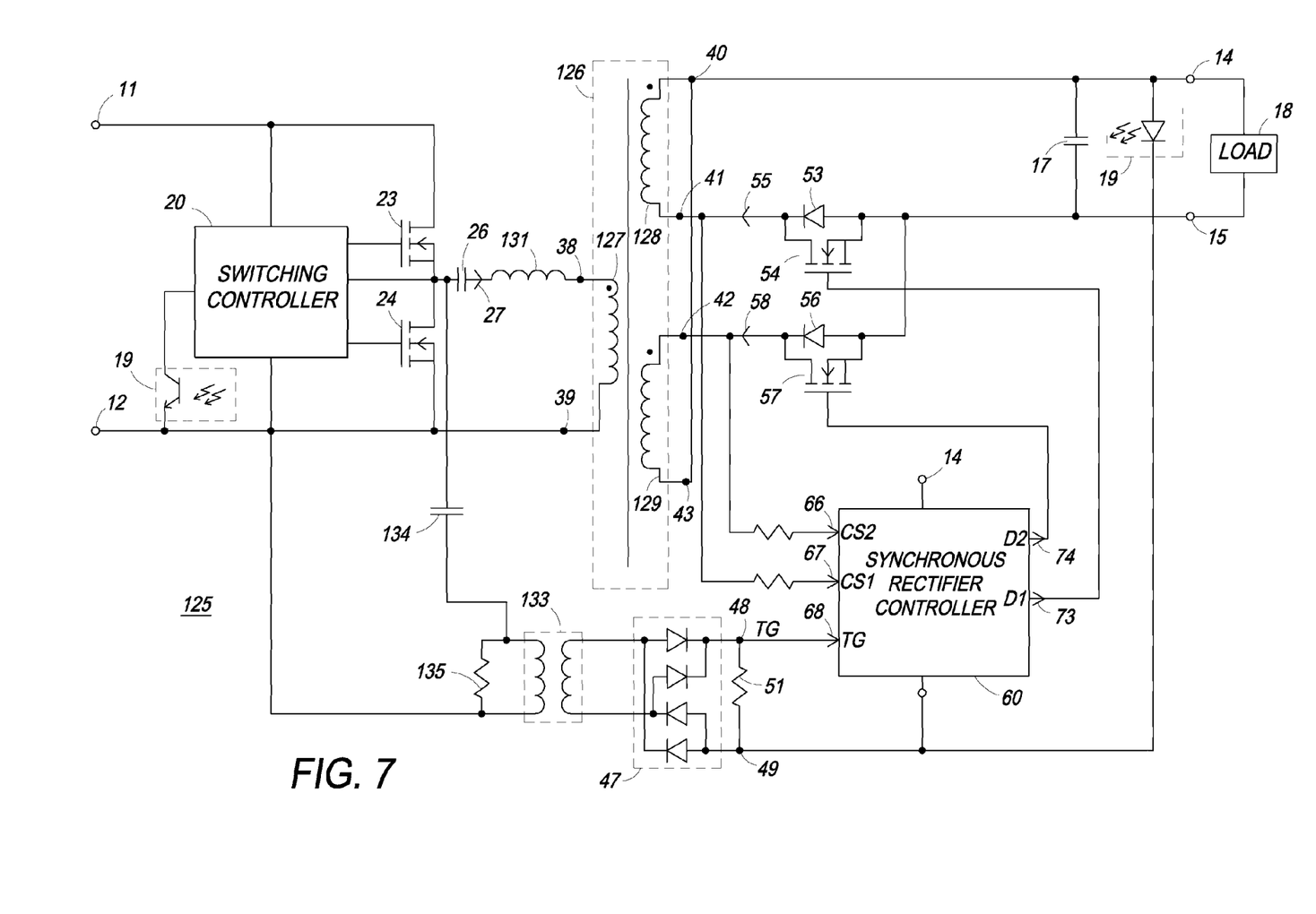
FIG. 7 schematically illustrates an embodiment of a portion of another series resonant switching power supply system in accordance with the present invention.

FIG. 7 schematically illustrates an embodiment of a portion of a series resonant switching power supply system 125. System 125 is similar to system 10 except that system 125 is a resonant converter that doesn't use the transformer with leakage inductance to form the desired loose coupling. System 125 includes a transformer 126 that has a primary winding 127, and secondary windings 128 and 129. The leakage inductance between winding 127 and either of windings 128 and 129 is usually is about two to five per cent (2%-5%) of the magnetizing inductance. However, in the preferred embodiment, the leakage inductance of transformer 30 is about twenty-five per cent (25%) of the magnetizing inductance. Thus, it can be seen that transformer 30 has a high leakage inductance but transformer 126 has a lower leakage inductance. Consequently, system 125 includes a resonant inductor 131 that is coupled between transformer 126 and the output of the switch formed by transistors 23 and 24. Generally, inductor 131 is placed in series between capacitor 26 and one terminal of transformer 126. The inductance of inductor 131 is chosen to provide the a delay time similarly to the delay time that results from the leakage inductance of transformer 30 that was explained in the description of FIGS. 1-6. System 125 also includes a pulse transformer 133 and a capacitor 134 that is coupled in series between transformer 133 and the output of the switch formed by transistors 23 and 24. Transformer 133 and capacitor form the trigger pulses from the drive signal formed by transistors 23 and 24. Because of the delay time induced by inductor 131, the trigger signal formed by system 125 is representative of a reversal of the voltage at the common node between transistors 23 and 24. A ballast resistor 135 is connected across the primary of transformer 133 in order to suppress parasitic capacitances and to provide a current path of the demagnetization current from transformer 133.

Figure 8:
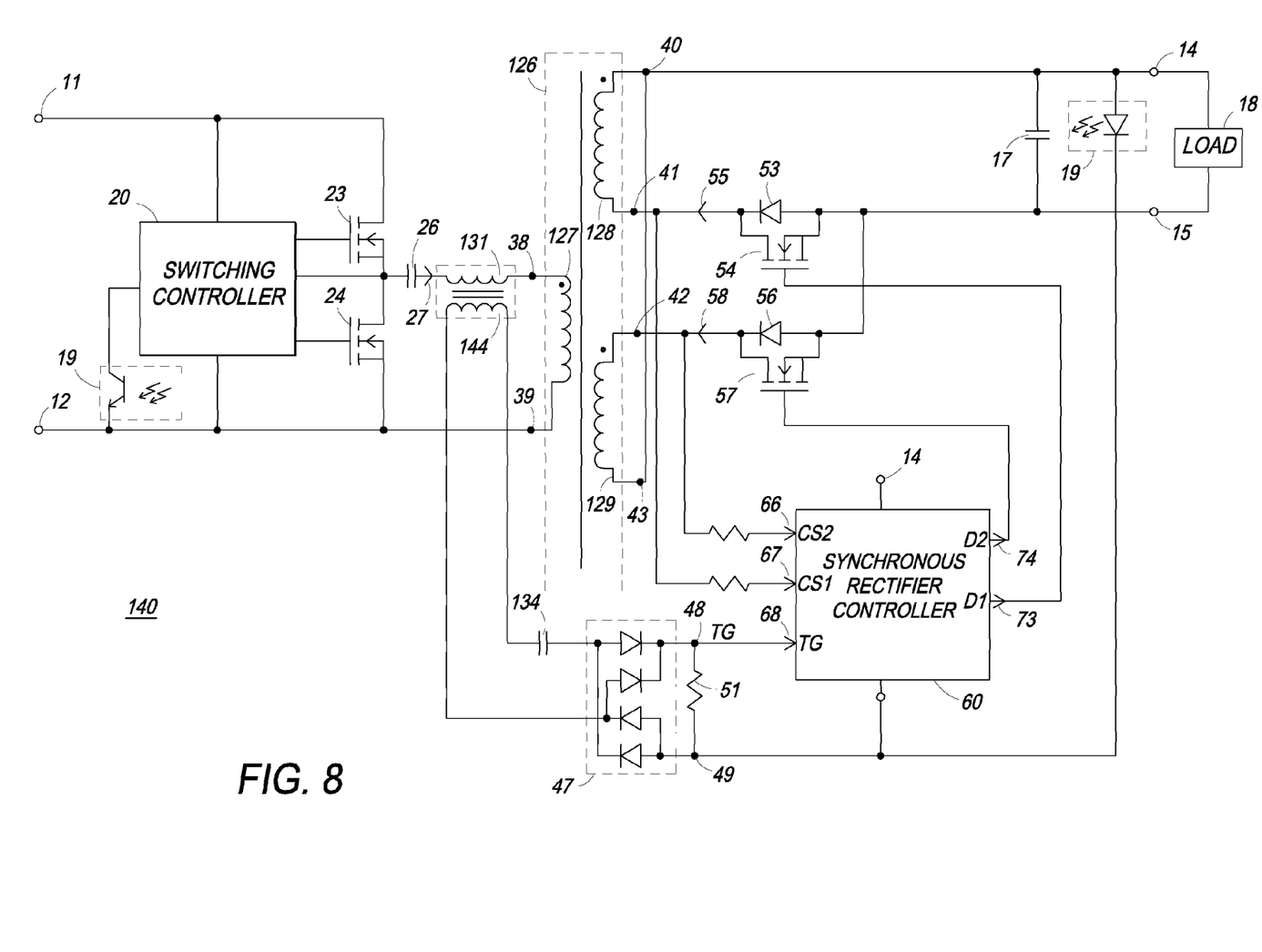
FIG. 8 schematically illustrates an embodiment of a portion of still another series resonant switching power supply system in accordance with the present invention.

FIG. 8 schematically illustrates an embodiment of a portion of a series resonant switching power supply system 140. System 140 is similar to system 125 except that system 140 replaces transformer 133, and resistor 135 with an auxiliary winding 144 that is magnetically coupled to inductor 131. Auxiliary winding 144 is used sense the drive signal formed by primary side switching power supply controller 20 and responsively form the trigger pulses from the drive signal formed by transistors 23 and 24. Using auxiliary winding 144 facilitates using resonant inductor 131 to assist in forming the trigger pulse without using another external transformer such as pulse transformer 133 thereby reducing the cost of system 140.

In view of all of the above, it is evident that a novel device and method is disclosed. Included, among other features, is forming a circuit to disable the secondary side synchronous rectifier prior to the secondary side current reducing to a low or substantially zero value or before the secondary side voltage reverses polarity. Also included is forming a trigger signal that is representative of the primary side voltage reversing polarity and using the trigger signal to disable the secondary side synchronous rectifier transistors 54 and 57 when the system is operating at frequencies that are greater than the resonant frequency of the system. Included is a series resonant switching power supply control circuit comprising:

a first input configured to receive a first sense signal that is representative of a secondary current through a secondary winding of a transformer of a series resonant switching power supply control system wherein the series resonant switching power supply control system has a resonant frequency;

a second input that is configured to receive a trigger signal that is representative of a reversal of a primary voltage across a primary winding of the transformer;

an output configured to form a switching drive signal that is used to operate a first switch that is coupled to the secondary winding;

a first circuit configured to enable the first switch responsively to the secondary current increasing from a first value to a second value; and the first circuit configured to disable the first switch responsively to the secondary current decreasing from the second value to the first value for operating frequencies of the switching power supply control system that are no greater than the resonant frequency, and to disable the first switch responsively to the trigger signal and not responsively to the secondary current decreasing from the second value for operating frequencies of the switching power supply control system that are greater than the resonant frequency.

Also, the first circuit may include a first control channel configured to inhibit the trigger signal from negating the switching drive signal if the first sense signal is received prior to the first control channel receiving the first sense signal. Further, the first control channel may also be configured to negate the switching drive signal if the trigger signal is received prior to the first control channel receiving the first sense signal. A storage element may be configured to store a state of receiving an asserted state of the first sense signal and wherein the first control channel is configured to use the stored state to inhibit the trigger signal from negating the switching drive signal. The storage element may be a latch. The first control channel can be configured to clear the stored state of the storage element a first time interval after the first sense signal is negated. The first control channel can be configured to form a minimum off-time of the switching drive responsively to receiving a negated state of the first sense signal and to maintain the switching drive signal negated for the minimum off-time and wherein the first time interval is substantially the same as the minimum off-time.

While the subject matter of the invention is described with specific preferred embodiments, it is evident that many alternatives and variations will be apparent to those skilled in the semiconductor arts. For clarity of the explanation, the operation of an exemplary embodiment of controller 60 is explained, however, other embodiments should provide similar operation as long as the implementation disables transistor 54 before the reversal of the secondary voltage when the system is operating at frequencies that are greater than the resonant frequency. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A series resonant switching power supply control circuit comprising:
   a first input configured to receive a first sense signal that is representative of a secondary current through a secondary winding of a transformer of a series resonant switching power supply control system wherein the series resonant switching power supply control system has a resonant frequency;
   a second input that is configured to receive a trigger signal that is representative of a reversal of a primary voltage across a primary winding of the transformer;
   an output configured to form a switching drive signal that is used to operate a first switch that is coupled to the secondary winding;
   a first circuit configured to enable the first switch responsively to the secondary current increasing from a first value to a second value; and
   the first circuit configured to disable the first switch responsively to the secondary current decreasing from the second value to the first value for operating frequencies of the switching power supply control system that are no greater than the resonant frequency, and to disable the first switch responsively to the trigger signal and not responsively to the secondary current decreasing from the second value for operating frequencies of the switching power supply control system that are greater than the resonant frequency.

2. The series resonant switching power supply control circuit of claim 1 wherein the first circuit includes a first control channel configured to inhibit the trigger signal from negating the switching drive signal if the first sense signal is received prior to the first control channel receiving the first sense signal.

3. The series resonant switching power supply control circuit of claim 2 wherein the first control channel is also configured to negate the switching drive signal if the trigger signal is received prior to the first control channel receiving the first sense signal.

4. The series resonant switching power supply control circuit of claim 3 wherein the first control channel includes a storage element that is configured to store a state of receiving an asserted state of the first sense signal and wherein the first control channel is configured to use the stored state to inhibit the trigger signal from negating the switching drive signal.

5. The series resonant switching power supply control circuit of claim 4 wherein the storage element is a latch.

6. The series resonant switching power supply control circuit of claim 4 wherein the first control channel is configured to clear the stored state of the storage element a first time interval after the first sense signal is negated.

7. The series resonant switching power supply control circuit of claim 6 wherein the first control channel is configured to form a minimum off-time of the switching drive responsively to receiving a negated state of the first sense signal and to maintain the switching drive signal negated for the minimum off-time and wherein the first time interval is substantially the same as the minimum off-time.

8. A method of operating a series resonant switching power supply system comprising:
   enabling a synchronous rectifier switch that is coupled to a secondary side of the series resonant switching power supply system responsively to a secondary current through a secondary winding increasing from a first value to a second value wherein the secondary winding is a secondary winding of a transformer of the series resonant switching power supply system;
   disabling the synchronous rectifier switch responsively to the secondary current through the secondary winding decreasing from the second value for operating frequencies of the series resonant switching power supply system that are no greater than a resonant frequency of the series resonant switching power supply system; and
   disabling the synchronous rectifier switch responsively to a primary voltage across a primary winding reversing polarity for operating frequencies of the series resonant switching power supply system that are greater than the resonant frequency wherein the primary winding is a primary side winding of the transformer.

9. The method of claim 8 wherein disabling the synchronous rectifier switch responsively to the secondary current includes coupling a control circuit to receive a sense signal that is representative of the secondary current; configuring the control circuit to assert a switching drive signal to enable the synchronous rectifier switch responsively to the secondary current increasing from the first value; and configuring the control circuit to negate the switching drive signal to disable the synchronous rectifier switch responsively to the secondary current decreasing from the second value.

10. The method of claim 9 wherein disabling the synchronous rectifier switch responsively to the primary voltage includes coupling the control circuit to receive a trigger signal that is representative of a reversal of the primary voltage; and configuring the control circuit to negate the switching drive signal to disable the synchronous rectifier switch responsively to the trigger signal.

11. A method of forming a series resonant switching power supply control system comprising:
providing a transformer;
coupling a capacitor to the transformer to form a resonant frequency of the series resonant switching power supply control system;
operably coupling a primary side controller to reverse a primary voltage across a primary winding of the transformer at a first frequency;
coupling a first switch to a secondary winding of the transformer;
configuring a first circuit to enable the first switch responsively to a secondary current through the secondary winding increasing from a first value to a second value; and
configuring the first circuit to disable the first switch responsively to the secondary current decreasing from the second value responsively to the first frequency being no greater than the resonant frequency, and configuring the first circuit to disable the first switch responsively to the primary voltage reversing polarity and not responsively to the secondary current decreasing from the second value responsively to the first frequency being greater than the resonant frequency.

12. The method of claim 11 wherein configuring the first circuit to disable the first switch responsively to the secondary current decreasing from the second value includes configuring the first circuit to receive a sense signal that is representative of the secondary current and to receive a trigger signal that is representative of the primary voltage reversing polarity; and configuring the first circuit to inhibit the trigger signal from negating the switching drive signal responsively to the first frequency being no greater than the resonant frequency.

13. The method of claim 12 wherein configuring the first circuit to inhibit the trigger signal from negating the switching drive signal includes configuring the control circuit to store a state of receiving an asserted state of the sense signal prior to receiving an asserted state of the trigger signal, and configuring the control circuit to use the stored state to inhibit the trigger signal from negating the switching drive signal.

14. The method of claim 13 wherein configuring the control circuit to store a state of receiving an asserted state of the sense signal includes configuring the control circuit to set a latch responsively to receiving the asserted state of the sense signal prior to receiving the asserted state of the trigger signal.

15. The method of claim 12 wherein configuring the first circuit to disable the first switch responsively to the primary voltage reversing polarity includes configuring the first circuit to inhibit the sense signal from negating the switching drive signal and to use the trigger signal to negate the switching drive signal responsively to the first frequency being greater than the resonant frequency.

16. The method of claim 15 wherein configuring the first circuit to inhibit the sense signal from negating the switching drive signal includes configuring the control circuit to store a state of receiving an asserted state of the trigger signal prior to receiving an asserted state of the sense signal, and configuring the control circuit to use the stored state to enable the trigger signal to negate the switching drive signal.

17. The method of claim 16 wherein configuring the control circuit to store the state of receiving an asserted state of the trigger signal prior to receiving an asserted state of the sense signal includes configuring the control circuit to ensure that a latch is reset if the asserted state of the trigger signal is received prior to receiving the asserted state of the sense signal.

18. The method of claim 11 further including coupling a resonant inductor in series with the capacitor to receive a primary switching signal from the primary side controller, and coupling an auxiliary winding with the resonant inductor wherein the auxiliary winding forms a signal that is representative of the primary switching signal.

* * * * *